US012683952B2

(12) United States Patent
Mishaev

(10) Patent No.: US 12,683,952 B2
(45) Date of Patent: *Jul. 14, 2026

(54) REMOTE ACCESS COMPUTER SECURITY

(71) Applicant: CORONET CYBER SECURITY LTD., Tel-Aviv (IL)

(72) Inventor: Mark Mishaev, Be'er-Sheva (IL)

(73) Assignee: CORONET CYBER SECURITY LTD., Tel-Aviv (IL)

( * ) Notice: Subject to any disclaimer, the term of this patent is extended or adjusted under 35 U.S.C. 154(b) by 57 days.

This patent is subject to a terminal disclaimer.

(21) Appl. No.: 18/634,726

(22) Filed: Apr. 12, 2024

(65) Prior Publication Data

US 2024/0259367 A1 Aug. 1, 2024

Related U.S. Application Data

(63) Continuation of application No. 16/638,114, filed as application No. PCT/IB2017/055450 on Sep. 10, 2017, now Pat. No. 12,107,845.

(51) Int. Cl.
*H04L 9/40* (2022.01)

(52) U.S. Cl.
CPC .......... *H04L 63/0823* (2013.01); *H04L 63/10* (2013.01); *H04L 63/20* (2013.01); *H04L 63/205* (2013.01)

(58) Field of Classification Search
CPC ..... H04L 63/0823; H04L 63/10; H04L 63/20; H04L 63/205
See application file for complete search history.

(56) References Cited

U.S. PATENT DOCUMENTS

| | | | |
|---|---|---|---|
| 8,799,993 B1 * | 8/2014 | Efrati | H04L 63/205 709/225 |
| 9,615,255 B2 * | 4/2017 | Milchtaich | H04W 12/08 |
| 2010/0242082 A1 * | 9/2010 | Keene | H04W 12/065 726/1 |
| 2014/0019955 A1 * | 1/2014 | Summerer | G06F 8/65 717/171 |
| 2014/0053280 A1 * | 2/2014 | Durazzo | H04L 63/10 726/28 |
| 2014/0259095 A1 * | 9/2014 | Bryant | H04L 63/20 726/1 |
| 2014/0282860 A1 * | 9/2014 | Efrati | H04W 12/37 726/1 |
| 2014/0344891 A1 * | 11/2014 | Mullick | H04L 63/105 726/1 |
| 2016/0006693 A1 * | 1/2016 | Salcedo | H04L 63/0414 726/1 |
| 2016/0323746 A1 * | 11/2016 | Milchtaich | H04L 63/1425 |

(Continued)

*Primary Examiner* — Cheng-Feng Huang
(74) *Attorney, Agent, or Firm* — Michael A. Whittaker

(57) ABSTRACT

A computer implemented method of remote access computer security, the method comprising steps a computer processor is programmed to perform, the steps comprising: by a computer, receiving and combing data on a client device, data on a user of the client device, data on a network, and data on an information technology service, determining a policy for controlling remote access to the information technology service based on the combined data, and controlling remote access of the user to the information technology service using the remote client device over the network, based on the determined policy.

19 Claims, 7 Drawing Sheets

(56)         References Cited

U.S. PATENT DOCUMENTS

2016/0335451 A1\*  11/2016  Sinor  ................... H04L 63/102
2017/0012935 A1\*   1/2017  Raman ............... H04L 63/1458
2017/0026382 A1\*   1/2017  Trigger  .................. H04L 63/20

\* cited by examiner

REMOTE ACCESS COMPUTER SECURITY

CROSS-REFERENCE TO RELATED APPLICATIONS

The present application is a continuation of U.S. patent application Ser. No. 16/638,114, filed Feb. 10, 2020, which is the United National Phase application based on International Patent Application No. PCT/IB2017/055450, filed Sep. 10, 2017, the contents of each of which are incorporated herein by reference.

FIELD AND BACKGROUND OF THE INVENTION

The present invention relates to computer security and, more particularly, but not exclusively to an apparatus and method of remote access computer security.

In the days before this era of remote access to computer services, an organization would usually have a tightly controlled and hard-wired network that would provide the organization with a certain degree of physical security as network access could be limited to users that were physically located in the organization's premises. Usually, users would also be required to type in a name and a password, thus adding another layer to the physical security of the network.

In this era of remote access to information technology services, millions of users access computer services through remote communication to server computers, say to computers that provide users with a cloud based Saas (Software as a Service) service, as known in the art.

Indeed, wide adoption of ubiquitous cloud-based Software-as-a-Service (SaaS) and other cloud based information technology services and the productivity and cost reduction benefits that they bring with them, have spurred many enterprises to allow mobile workforce to remotely access protected enterprise computing services.

As a result, the recent years have seen a growing number of sophisticated cyber attacks that targeted organizational computing resources and cloud services.

Organizations have invested a lot in data security too, though. For example, the security of some protected data processing resources has been enhanced using physical tokens or biometric methods. However, most client devices are either not in control of the organizations or are still not equipped with such capacities.

Thus, despite a growing level of threat and a record breaking proliferation of cyber attacks, many organizations still rely on relatively weak authentication methods for policing user access to their computing resources. In most cases, password protection is still the only method used to control access to computer systems, computer networks, and other data processing resources.

SUMMARY OF THE INVENTION

According to one aspect of the present invention there is provided a computer implemented method of remote access computer security, the method comprising steps a computer processor is programmed to perform, the steps comprising: by a computer, receiving and combing data on a client device, data on a user of the client device, data on a network, and data on an information technology service, determining a policy for controlling remote access to the information technology service based on the combined data, and controlling remote access of the user to the information technology service using the remote client device over the network, based on the determined policy.

According to a second aspect of the present invention there is provided an apparatus of remote access computer security, the apparatus comprising: a processor of a computer, a data receiver, implemented on the processor, configured to receive and combine data on a client device, data on a user of the client device, data on a network, and data on an information technology service, a policy determiner, in communication with the data receiver, configured to determine a policy for controlling remote access to the information technology service based on the combined data, and an access controller, configured to control remote access of the user to the information technology service using the client device over the network, based on the determined policy.

According to a third aspect of the present invention there is provided a non-transitory computer readable medium storing computer processor executable instructions for performing steps of remote access computer security on a computer, the steps comprising: by the computer, receiving and combing data on a client device, data on a user of the client device, data on a network, and data on an information technology service, determining a policy for controlling access to the information technology service based on the combined data, and controlling access of the user to the information technology service using the client device over the network, based on the determined policy.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. The description taken with the drawings making apparent to those skilled in the art how the several forms of the invention may be embodied in practice.

In the drawings.

DESCRIPTION OF THE PREFERRED EMBODIMENTS

Figure 1A:
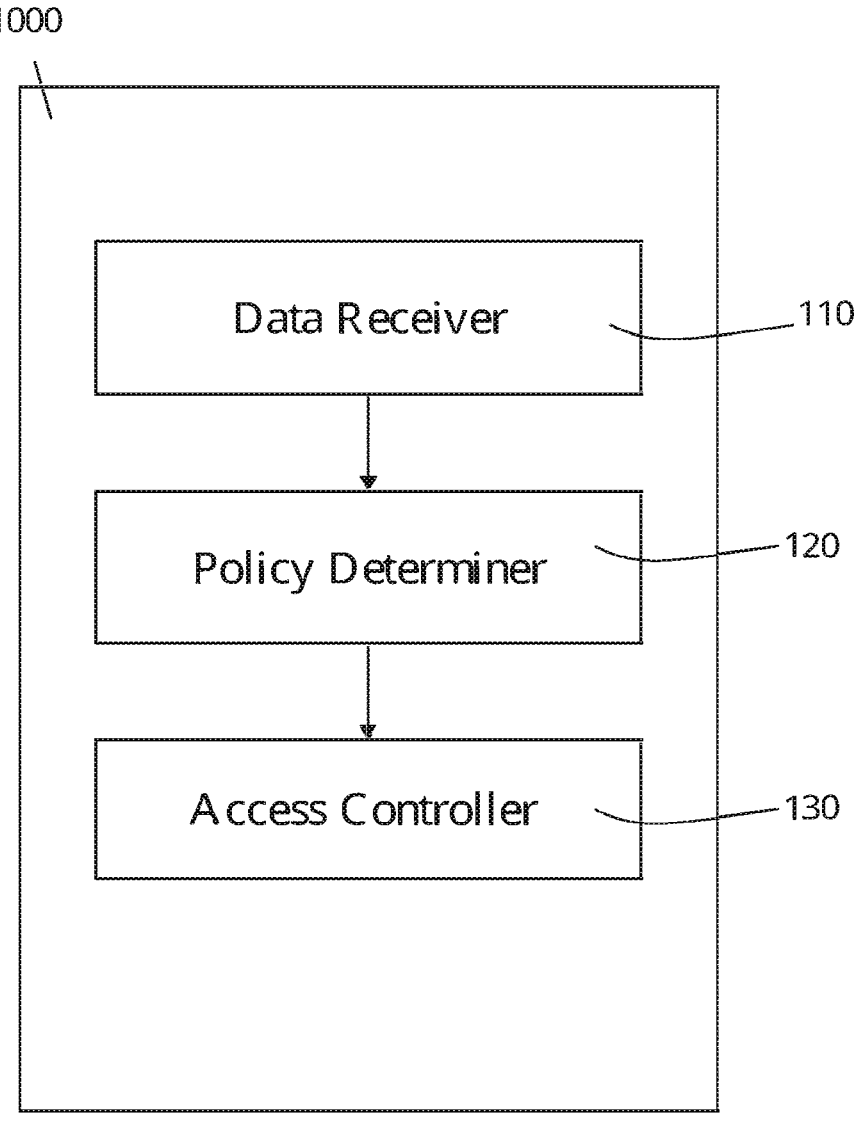
FIG. 1A is a simplified block diagram schematically illustrating an exemplary apparatus for remote access computer security, according to an exemplary embodiment of the present invention.

The present embodiments comprise an apparatus and method of remote access computer security.

As described hereinabove, despite a growing number of threats and a record breaking proliferation of cyber attacks, many organizations still rely on relatively weak authentication methods for policing users' remote access to their computing resources. In most cases, password protection is still the only method used by organizations to control access to their computer systems, computer networks, cloud based computing services, and other data processing resources owned or subscribed to by the organizations.

According to some exemplary embodiments of the present invention, an organization may control remote access of users to the organization's information technology services (say to an information system, database, cloud service that the organization subscribes to, etc.), based on a criterion that is based on a combination of parameters.

According to the exemplary embodiments, an exemplary computer implemented method of remote access computer security, includes steps that a processor of computer (say a dedicated server computer), is programmed to perform.

In the exemplary method, there is received and combined data on a client device (say a laptop, tablet, smart phone, etc.)—say on the device's configuration and data on a user of the client device—say the user's username or biometric data, as described in further detail hereinbelow.

In the method, there is further received and combined with the data on the device and the user, data on an IT (Information Technology) service (say a cloud service that the user is connected to or intends to connect to), and on a network (say a network used by the user when connected to the service), as described in further detail hereinbelow.

The data on the device's configuration may include, for example, data listing applications installed on the client device, data on statuses of applications installed on the client device (say that a specific application used for encrypting files on the client device is stopped or removed), etc., as described in further detail hereinbelow.

The data on the network may include, for example, data identifying an access point that the user's client device is connected to, data that lists access points revealed in a scan carried out by the client device, data that indicates that a one or more access points as malicious, etc., as described in further detail hereinbelow.

The data on the IT service may include, for example, the service's status (say that the service is under hackers attack), the service's configuration (say a use of a vulnerable program by the service), a user-specific configuration of the service (say that a specific user connected to the service can access all documents on the service), etc.

Optionally, the data on the user, device, network and service is stored in a database that is also referred to hereinbelow as a context database. The context database stores a plurality of records. Each one of records holds a specific combination of user, device, network and service attributes, thus recording a specific circumstance in which the device, network and service is used by the specific user, as described in further detail hereinbelow.

In the method, when a user attempts to access an IT service (say a cloud service), there is determined a policy for controlling access to the service based on the combined data, say using one or more of the records stored in the context database and a database of policies, as described in further detail hereinbelow.

Then, the remote access of the user to the information technology service using the client device over the network is controlled based on the determined policy, as described in further detail hereinbelow.

Optionally, the policy is periodically re-determined while the user is still connected to the service (say every two minutes), as described in further detail hereinbelow.

In one example, an user-employee who wishes to access a cloud service on which the user's employer stores confidential documents, using a laptop computer on which a specific document reader is installed by the employer, is allowed access to the cloud service over any network, as long as the reader is active on that laptop.

However, in the example, if the reader is disabled or removed from the user's laptop, the user is allowed to access the cloud service using the laptop only over the employer's internal, local area network that is installed in the employer's main office, and the user is not allowed to access the service using any other client device.

Thus, with the exemplary embodiment, user access to a information technology service may be controlled before and during the service' use by the user, based on a data combination that includes data on the user, data on the client device, and data on the network, as well as data on the information technology service.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings.

The invention is capable of other embodiments or of being practiced or carried out in various ways. Also, it is to be understood that the phraseology and terminology employed herein is for the purpose of description and should not be regarded as limiting.

Reference is now made to FIG. 1A, which is a simplified block diagram schematically illustrating an exemplary apparatus for remote access computer security, according to an exemplary embodiment of the present invention.

An apparatus 1000 for remote access computer security, according to one exemplary embodiment of the present invention, is implemented on a computer that communicates with client devices such as a smart mobile phone, a tablet computer, a laptop computer, etc., as described in further detail hereinbelow.

Optionally, the computer is actually one or more computers, say one or more server computers of an organization, one or more computers that provide data security services for one or more parties, etc., as described in further detail hereinbelow.

The computer is used for controlling remote access of users to an information technology (IT) service using client devices such as a laptop computer, a tablet computer, a smart phone, etc., or any other computer that is used by a user for accessing the service. The computer that is used for controlling the access, is also referred to hereinbelow as an access control computer.

The IT service may include, but is not limited, to a cloud information technology service, a database, an information system, a software development tool, etc., or any other service implemented on the access control computer, on a computer in communication with the access control computer, or on both.

In a first example the service is an organization's information system, database, software development tool, etc., or any combination thereof. In the example, the service is implemented on a computer that is also used by the organization for the controlling of remote access to the service using a client device (say an employee's smart phone or laptop)—i.e. on the access control computer.

In a second example, the service is rather implemented on a computer other than the organization's computer used to control the access, say on a server computer used by a party other than the organization (say by a cloud services provider, as known in the art), say to store documents uploaded by the organization to the service.

Optionally in the second example, the apparatus 1000 controls remote access of users that are the organization's employees to the service using client devices over one or more networks, say by dynamically communicating changes to the service's user-specific authorization data to the service. The changes may be communicated before the user is allowed access to the service, afterwards—when the user is already using the service, or rather both before and after the user is allowed the access, as described in further detail hereinbelow.

The apparatus 1000 includes the access control computer's one or more computer processors and one or more of the additional parts described in further detail hereinbelow, say the parts denoted 110-130 in FIG. 1A.

The additional parts may be implemented as software—say by programming the computer processor to execute steps of the methods described in further detail hereinbelow, by hardware—say by electric circuits, computer memories, etc., or any combination thereof.

Thus, in one exemplary embodiment, the exemplary apparatus 1000 includes a computer processor of the access control computer.

The apparatus 1000 further includes a data receiver 110, implemented on the computer processor.

The data receiver 110 receives and combines data on a client device (say on the client device's configuration) and data on a user of the client device (say the user's username or biometric data).

The data receiver 110 may receive the data on the client device and the data on the user from the client device, from a computer other than the client device (say from a computer used by an organization's System administrator or Database Administrator), etc., or any combination thereof, as described in further detail hereinbelow.

The data on the client device's configuration may include, but is not limited to data listing applications installed on the device, data on statuses of applications installed on the device (say that a specific application used for encrypting files on the client device is stopped or removed), etc., as described in further detail hereinbelow.

The data on the client device may additionally or alternatively include data on one or more activities carried out by the user on the client device, say a repeated attempt to stop an anti-virus program installed on the device, etc., as described in further detail hereinbelow.

The data receiver 110 further receives and combined with the data on the user and the client device, data on a network—say a name of an access point used for the access, and data on an information technology service—say on a cloud service or database that the user is connected to or that the user attempts to connect to.

The data on the network may include, but is not limited to data identifying the access point that the user's client device is connected to, data identifying access points revealed in a scan carried out by the client device, data that indicates that a specific access point is malicious, etc., as described in further detail hereinbelow.

The data on the service may include but is not limited to: the service's status (say that the service is under hackers attack), the service's configuration (say a use of a vulnerable software component by the service), a user-configuration (say that a specific user connected to the service can access all documents on the service), etc.

The data receiver 110 may receive the data on the network and the data on the service from the client device, from a computer used by an organization's System Administrator or Database Administrator, from a computer that the information technology service is implemented on, from a client device other than the user's, etc., or any combination thereof.

Optionally, the data receiver 110 stores the data on the user, device, network and information technology service in a database also referred to hereinbelow as a context database.

The context database stores a plurality of records. Optionally, each one of the records holds a specific combination of user, device, network and service attributes, thus recording a specific circumstance of device, network and service used by the specific user, as described in further detail hereinbelow.

Optionally, prior to storing the data on the context database, the data receiver 110 transforms the received data, as described in further detail hereinbelow and as illustrated, for example, in FIG. 5.

The apparatus 1000 further includes a policy determiner 120, in communication with the data receiver 110.

When the user attempts to access a service (say a cloud service), the policy determiner 120 determines a policy for controlling access to the information technology service based on the combined data, say using one or more of the records stored in the context database, as described in further detail hereinbelow.

Optionally, for determining the policy, the policy determiner 120 further uses a database of policies predefined in advance, say by an operator or programmer of the apparatus 1000, say using the policy data definer, as described in further detail hereinbelow.

In one example, the policy determiner 120 determines the policy by selecting a policy defined for the specific combination of data on the user (say username), client device (say that the device in iOS jail broken), network (say an access point's name), and service (say a specific service name) from the database of policies.

Specifically, in the example, the data receiver 110 receives the user's username (say 'Jon S') from the service, and the policy determiner 120 uses the username to select one or more relevant records, recently (say in the last hour or two) updated in the context database by the data receiver 110.

In the example, based on the records selected from the context database, the policy determiner 120 concludes that the user's client device is an iOS jail broken device, that the user is connected to an access point called 'CORO-001', and that the service that the user attempts to access, is often used by the user.

Then, the policy determiner 120 selects a policy defined for an attribute combination (say a relational database key) that includes the username's data ('Jon S'), the device' data ('Jail Broken'), the network's data ('CORO-001') and the service's data ('Often Used') from the database of policies.

Optionally, the policy determiner 120 uses additional data for selecting the policy from the database of policies.

For example, based on a white list of allowable access points predefined in advance by an administrator of the apparatus 1000, the policy determiner 120 may find the 'CORO-001' access point to be allowable. Based on that finding, the policy determiner 120 would rather use a more general attribute combination that includes the username's data ('Jon S'), the device' data ('Jail Broken'), the network's data ('Allowable') and the service's data ('Often Used').

In the example, the policy dictates that the user be allowed access to the service, but be restricted to reading only.

The apparatus 1000 further includes an access controller 130, in communication with the policy determiner 120.

The access controller 130 controls remote access of the user to the information technology service using the client device over the network, based on the policy determined by the policy determiner 120, as described in further detail hereinbelow.

The controlling of the access by the access controller 130 may include, but is not limited to, suspending the user's access to the service from the client device, suspending the user's access to the service from all client devices, restricting the user's access to specific activities, etc., as described in further detail hereinbelow.

For example, the access controller 130 may block or allow the user's attempt to login into the service, modify a user-specific configuration on the service while the user is already logged in (say for revoking the user's authorization to update files or access certain file libraries), disconnect the user from the service, etc.

In one example, the policy determined by the policy determiner 120 is a policy defined for the specific combination of the user's username, client device's being iOS jail broken, a specific access point used by the user in a recent time period of say, three minutes (i.e. network data), and a name of a specific service used by the user.

In the example, the policy dictates a restricting of the access to the service to user's own libraries only. Accordingly, the access controller 130 modifies a user-specific configuration that defines what the user can do on the service, such that the user is blocked from accessing any documents or data that do not reside in the specific user's libraries stored on the cloud service.

Thus, with the apparatus 1000, a user's remote access to an IT service such as an organization's computing resource (say a database or a cloud service account) may be controlled based on a data combination that includes data on the user, data on the device used by the user, data on the network used by the user, and data on the service.

Optionally, when carrying out one or more of the steps of the exemplary method or prior to carrying out one or more of the steps, the data receiver 110 communicates with the client device (say a smart mobile phone, tablet computer, or laptop computer, etc., as known in the art) in use by a user (say the employee).

Optionally, the receiving of the data on the client device by the data receiver 110 includes communicating with a client application that runs on the client device, for receiving at least a part of the data on the device. The client application extracts at least a part of the data on the client device, say from configuration data of the client device, and sends the extracted data to the data receiver 110, as described in further detail hereinbelow.

Optionally, the client application extracts the data on the client device from configuration data of the client device using operating system APIs (Application Programming Interfaces), as known in the art.

Optionally, the receiving of the data on the network by the data receiver 110 includes communicating with a client application that runs on the client device, for receiving at least a part of the data on the network. The client application extracts at least a part of the data on the network (say on an access point that the client device is connected to), on the client device, say from communication data that pertains to the network, while the client device is connected to the network.

Optionally, the receiving of the data on the network by the data receiver 110 includes communicating with a client application that runs on the client device, for receiving at least a part of the data. The client application extracts at least a part of the data on the network from a scan for access points, carried out by the client device. The client application may thus provide the apparatus 1000 with a list of access points in the user's vicinity, as found by the scan carried out by the client device, as described in further detail hereinbelow.

Optionally, the receiving 210 of the data on the client device includes receiving 210 data that indicates installation of a client application that extracts data on the client device from configuration data of the client device, on the client device.

In one example, the received data that indicates the installation is a digital certificate received by the data receiver 110 from the client device, as described in further detail hereinbelow.

Optionally, the receipt of the data that indicates installation of the client application is used to distinguish between monitored client device and unmonitored client devices, when controlling the remote access of client devices to the information technology service.

For example, the receipt of the data that indicates installation of the client application may be used as a prerequisite for the remote access, such that absent the receipt of the data that indicates the installation, the user is not allowed access to the information technology service, as described in further detail hereinbelow.

Optionally, the data receiver 110 further communicates with one or more client devices other than that user's, with a computer on which the service is implemented, etc., say for receiving the data on the service, the data on the network, data on other networks, etc., as described in further detail hereinbelow.

In a first example, the data receiver 110 receives at least a part of the data on the service by querying configuration database tables of a database used on the computer that implements the service, say for data on configuration of the service, on current load on the service (say the number of users), etc.

In a second example, the data receiver 110 receives at least a part of the data on the service by querying configuration tables of a database used on the computer that implements the service. In the example, the data receiver 110 queries the configuration tables for data on a user-configuration (say a user-specific configuration) of the service, say on authorizations granted to each active (i.e. logged in) user.

Optionally the apparatus 1000 further includes a policy data definer (not shown), in communication with the policy determiner 120.

The policy data definer is operable by an operator, administrator or programmer of apparatus 1000, to define and update policies for the policy determiner 120 to use.

In one example, the policy data definer is used by the operator to define the policies using user-device-network-service specific database records, each of which records defines a policy specific for one user-device-network-service combination. Each one of the records is thus a unique record that is specific for one user-device-network-service circumstance, as described in further detail hereinbelow.

Optionally, the apparatus 1000 further includes a user authenticator (not shown), in communication with the data receiver 110.

The user authenticator authenticates data on the user as received from the client device (say username, password, or biometric data provided by the user on the client device) say using an Identity Provider (IDP), also known as an Identity Assertion Provider, as known in the art.

Optionally, the IDP itself provide at least a part of the data on the user to the data receiver 110 (either directly or through the user authenticator), say by providing data extracted by the IDP from social networking services such as Facebook™ or Tweeter™ to the data receiver 110 directly or to the user authenticator.

Optionally, working in tandem, the parts of the apparatus 1000 carry out the steps of the exemplary method illustrated using FIG. 2 hereinbelow, such that the steps of the exemplary method are repeated periodically. In one example, the steps are repeated every time period (say two minutes), as defined in advance by a user, operator or programmer of the apparatus 1000. In a second example the steps are repeated whenever new data on a user, client device, network, service, or any combination thereof is received by the data receiver 110.

As a result, the data receiver 110 periodically updates the combined data with newly received data, the policy determiner 120 re-determines the policy in light of the updated combined data, and the access controller 130 controls the access based on the re-determined policy while the user is still connected to the IT service.

An organization may thus be able to dynamically monitor, condition, and control remote access to the organization's internal information technology services (say databases, file systems, etc.), external information technology services (say cloud service accounts), or both, in a continuous or nearly continuous manner.

Thus in one example, when a user is an organization's employee who is connected to a cloud service with the employee's laptop via an access point operated by an organization, the user can access all documents stored by the organization on the cloud service.

However, if while interacting with the service, the user switches to a public access point of a restaurant or bar, or to the user's private smart phone, in a few seconds time, the service's user-configuration data that pertains to the user is updated by the access controller 130. As a result, the user can no longer access some of the organization's documents stored on the cloud service, (say documents classified by the organization as sensitive or stored in a specific library).

Figure 1B:
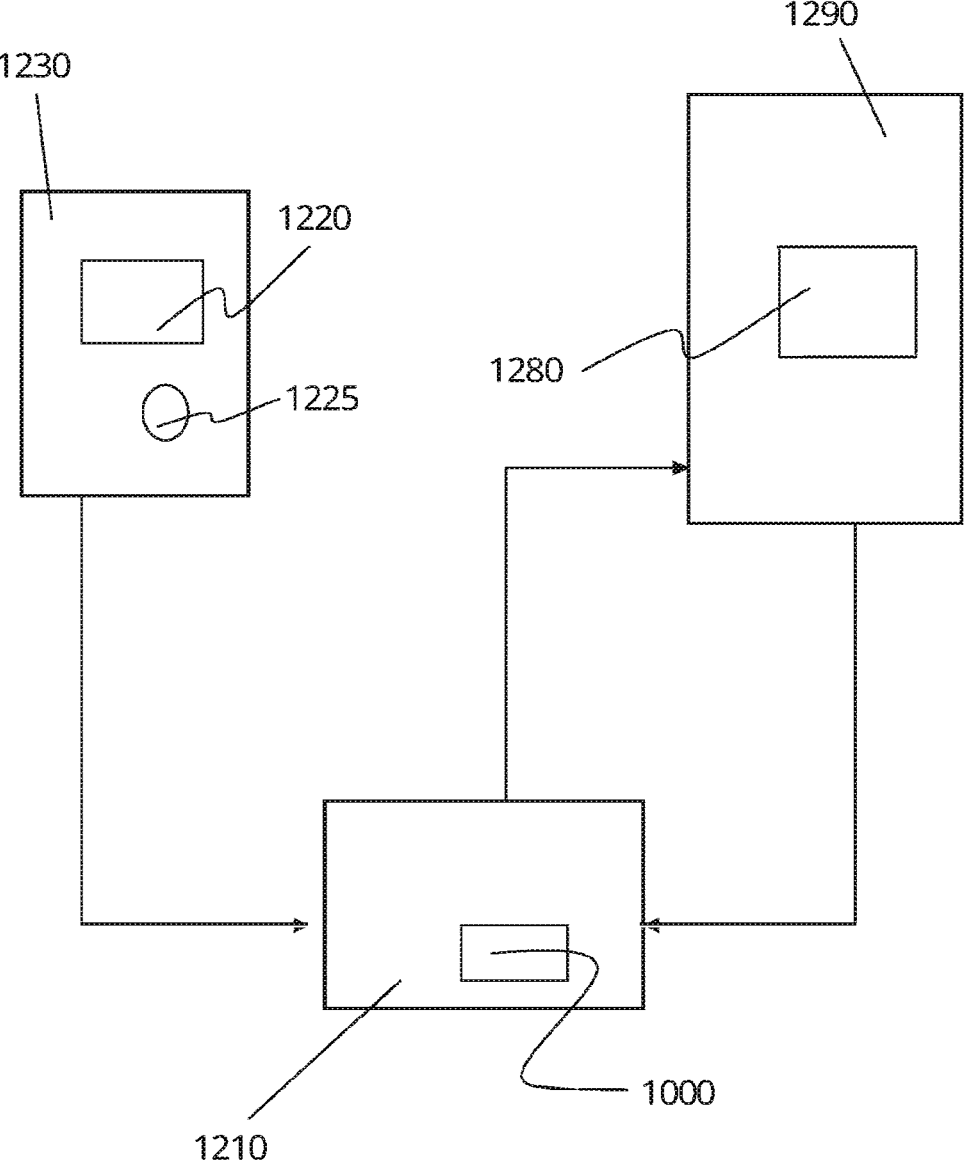
FIG. 1B is a simplified block diagram schematically illustrating an exemplary system for remote access computer security, according to an exemplary embodiment of the present invention.

Reference is now made to FIG. 1B, which is a simplified block diagram schematically illustrating an exemplary system for remote access computer security, according to an exemplary embodiment of the present invention.

An exemplary system according to one exemplary embodiment of the present invention, includes apparatus 1000 implemented on a first computer 1210. The apparatus 1000 is also referred to hereinbelow as a context provider 1000.

The exemplary system provides for a controlling of remote access of a user to a computing service 1280 (say to a cloud based service such as a SaaS application) that is implemented on computer 1290 that is remote from both the first computer 1210 and a client device 1230 used by a user to access the service 1280.

With the system, the controlling of access is based on a data combination that includes data on the user, on the client device 1230, on a network that is used by the user for accessing the service 1280 or that is revealed in a scan carried out by the device 1230, and data on the service 1280, as described in further detail hereinbelow.

The context provider (i.e. apparatus 1000 serving as a part of the first exemplary system) may be used by a specific organization, or rather be used as a cloud based security service that provides data security services to two or more organizations.

The exemplary system further includes a client application 1220 implemented on the client device 1230 (say a smart phone, laptop computer, tablet computer, etc., as described in further detail hereinabove). The client application 1220 is also referred to hereinbelow as a context monitoring agent 1220.

Optionally, for receiving at least a part of the data on the client device 1230, the apparatus 1000 communicates with the context monitoring agent 1220. The context monitoring agent 1220 runs on the client device 1230 and extracts at least a part of the data on the client device 1230.

In one example, the context monitoring agent 1220 extracts at least a part of the data from configuration data of the client device 1230 using operating system APIs (Application Programming Interfaces), by directly reading operating system files, etc., as known in the art.

Optionally, for receiving at least a part of the data on the network, the apparatus 1000 communicates with the context monitoring agent 1220. The context monitoring agent 1220 extracts at least a part of the data on the network from communication data (say an access point's SSID) that pertains to the network, while the device 1230 is connected to the network.

Optionally, for receiving at least a part of the data on the network, the apparatus 1000 communicates with the context monitoring agent 1220, and the context monitoring agent 1220 extracts at least a part of the data on the network from a scan for access points, which scan is carried out by the client device 1230.

Optionally, for receiving at least part of the data on the service, the apparatus 1000 communicates with the computer 1290 that the service 1280 is implemented on, for receiving data on a status of the service (say an overload of users), on a configuration of the service, etc., as described in further detail hereinabove.

Optionally, the apparatus 1000 communicates with the client device 1230 for receiving data (say a digital certificate) 1225 that indicates installation of the context monitoring agent 1220, Optionally, the receipt of the data that indicates installation of the context monitoring agent 1220 is used as a prerequisite for the remote access, such that absent the receipt of the data that indicates the installation, the user is not allowed access to the service 1280, as described in further detail hereinabove.

Optionally, the apparatus 1000 further communicates with client devices other than that user's, with one or more other computers, or both, for receiving at least a part of the data on the device 1230, service 1280, network, other networks, etc., or any combination thereof, as described in further detail hereinabove.

Based on a combination of data that includes the data on the client device 1230, the device's 1230 user, the network, and the service 1280, the apparatus 1000 (i.e. context provider of the system) determines an access control policy, and controls access of the user to the service 1280 using the client device 1230 over the network.

In one example, when the user attempts to login into the service 1280, the computer 1290 on which the service 1280 is implemented redirects the user's client device 1230 to the context provider (i.e. apparatus 1000). Then, communication between the client device 1230 and the service 1280 flows through the computer 1210 that implements the context provider 1000. As a result, the context provider 1000 controls the user's remote access to the service 1280 using the client device 1230 over the network used for the access, say by allowing or blocking the user's login attempt.

In a second example, the context provider 1000 controls the user's remote access to the service 1280 by modifying configuration data of the service 1280, on the service 1280 (i.e. on the computer 1290 that implements the service 1280), say by revoking the user's authorization to update or access certain files.

That is to say that in the second example, the context provider 1000 controls the accessing by modifying user-configuration (say user-specific configuration) of the service 1280, say for changing the authorizations granted to the user's account on the service 1280. Optionally, the authorizations are changed while the user is still login, as described in further detail hereinabove.

In one example, with the exemplary system, the user undergoes a two-step authorization process, as described in further detail hereinbelow. The process includes:

1) An authentication step in which, a standard authentication protocol such as a Security Assertion Markup Language (SAML) protocol is used by the apparatus 1000 to authenticate the user, as the user tries to access the service 1280, i.e. for receiving and authenticating data on the user.

In one exemplary case, an existing identity providers (IdP) is also in place, SAML authentication chaining capabilities (such as SAML chaining) are leveraged by the apparatus 1000. In the exemplary case, the user's original authentication request is automatically redirected to the IdP that is used as a single-sign-on (SSO) authority, as known in the art.

However, the apparatus 1000 further increases confidence in the security of the established session between the user's device 1230 and the service 1280 by verifying that the context monitoring agent 1220 is installed on the device 1230, using a digital certificate, as described in further detail hereinbelow.

2) Combining data on the user, the device, the network used by the device 1230 (and thus by the user) for accessing the service 1280, and the service 1280, to determine an access policy and control the user's access to the service 1280 based on the determined policy, as described in further detail hereinabove.

Figure 2:
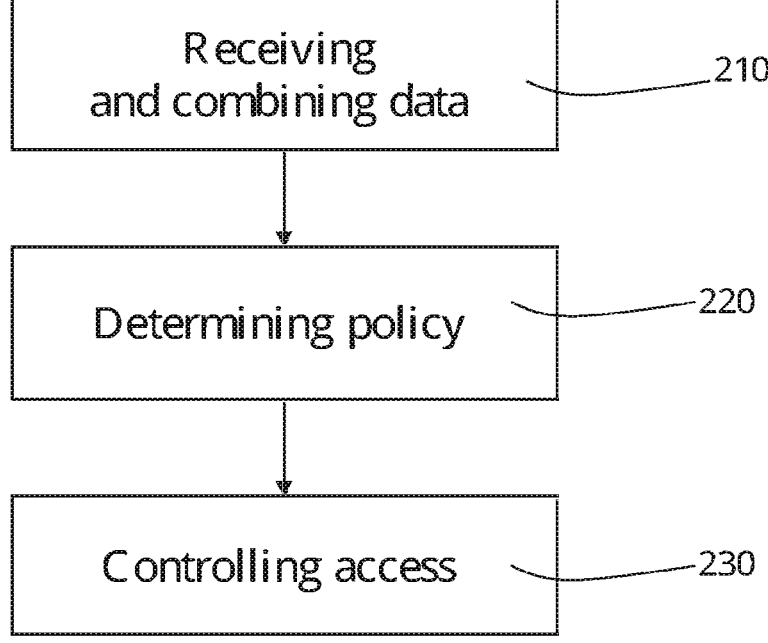
FIG. 2 is a simplified flowchart schematically illustrating an exemplary method of remote access computer security, according to an exemplary embodiment of the present invention.

Reference is now made to FIG. 2, which is a simplified flowchart schematically illustrating an exemplary method of remote access computer security, according to an exemplary embodiment of the present invention.

An exemplary method of remote access computer security, according to an exemplary embodiment of the present invention, may be executed by one or more processors of a computer. Optionally, the computer is actually one or more computers, say one or more server computers of an organization, one or more computers that provide data security services for one or more parties, etc., as described in further detail hereinabove.

The computer is used for controlling remote access of users to an information technology (IT) service using client devices such as a laptop computer, a tablet computer, a smart phone, etc., or any other computer that is used by a user for accessing the service. The computer user to control the access is also referred to hereinbelow as an access control computer.

The IT service may include, but is not limited, to a cloud information technology service, a database, an information system, a software development tool, etc., or any other service implemented on the access control computer, on a computer in communication with the access control computer, or on both.

In a first example the service is an organization's information system, database, a software development tool, etc., or any combination thereof. In the first example, the service is implemented on the computer that is also used by the organization for the controlling of remote access to the service using a client device (say an employee's smart phone or laptop)—i.e. on the access control computer.

In a second example, the service is rather implemented on a computer other than the organization's computer used to control the access, say on a server computer used by a party other than the organization (say by a cloud services provider, as known in the art), to store documents uploaded by the organization to the service.

Optionally in the second example, the access control computer controls remote access of users that are the organization's employees to the service using client devices over one or more networks, say by communicating changes to the service's user-specific authorization data to the service. The changes may be communicated before the user is allowed access to the service, afterwards—when the user is already using the service, or rather both before and after the user is allowed the access, as described in further detail hereinbelow.

The exemplary method includes steps that at least one computer processor of the computer used to control the access to the information technology service (i.e. the access control computer) is programmed to perform, as described in further detail hereinbelow.

In the method, there is received 210 and combined 210 data on a client device—say on the client device's configuration and data on a user of the client device—say the user's username or biometric data, say by the data receiver 110 of apparatus 1000, as described in further detail hereinabove.

The data on the client device and data on the user may be received 210 from the client device, from a computer other than the client device (say from a computer used by an organization's System administrator or Database Administrator), etc., or any combination thereof.

The data on the configuration may include but is not limited to: data listing applications installed on the client device, data on statuses of applications installed on the client device (say that a specific application used for encrypting files on the client device is stopped or removed), etc., as described in further detail hereinbelow.

The data on the client device may additionally or alternatively include data on one or more activities of the user on the client device—say an attempt to stop an anti-virus program, an attempt to remove restrictions imposed by the device's operating system (say an iOS jailbreak), etc., as described in further detail hereinbelow.

Also, received 210 and combined 210 with the data on the user and the client device, is data on a network—say an SSID (Service Set Identifier) of an access point used for the access, and data on an information technology service—say on a cloud service or database that the user is connected to or that the user attempts to connect to.

The data on the network may include but is not limited to: data that identifies the access point that the user's client device is connected to, data that list access points revealed in a scan carried out by the client device, data that indicates that a specific access point is malicious, etc., as described in further detail hereinabove.

The data on the service may include but is not limited to: the service's status (say that the service's website is hacked), on the service's configuration (say on a use of a vulnerable software component by the service), a user-configuration (say that a specific user connected to the service can access all documents on the service), etc.

The data on the network and the data on the service may be received 210 from the client device, from a computer used by an organization's System Administrator or Database Administrator, from a computer that the information technology service is implemented on, from a client device other than the user's, etc., or any combination thereof.

Optionally, the data on the user, device, network and service is stored (say by the data receiver 110) in a database also referred to hereinbelow as a context database. The context database stores a plurality of records. Optionally, each one of the records holds a specific combination of user, device, network and service attributes, thus recording a specific circumstance of device, network and service used by the specific user, as described in further detail hereinbelow.

Optionally, prior to storing the data on the context database, the received 210 data is transformed (say by the data receiver 110), as described in further detail hereinbelow, and as illustrated, for example in FIG. 5.

Further in the method, there is determined 220 a policy for controlling access to the information technology service based on the combined data, say by the policy determiner 120 of apparatus 1000 and using one or more of the records stored in the context database, as described in further detail hereinabove.

Optionally, for determining 220 the policy, there is further used a database of policies predefined in advance (say by an administrator of apparatus 1000), as described in further detail hereinabove.

In one example, the policy is determined 220 by selecting a policy defined for the specific combination of data on the user (say username), client device (say indication that the device is iOS jail broken), network (say access point's name), and service (say a specific cloud service name) from the database of policies, as described in further detail hereinabove.

Specifically, in the example, the user's username (say 'Jon S') is received 210 from the service and used for selecting one or more records, recently (say in the last five minutes) added or updated (say by the data receiver 110) in the context database, for the user's username.

Based on the selected records, there is concluded (say by the policy determiner 120) that the user's client device is an iOS jail broken device, that the user is connected to an access point called 'Dragon Bar—Free', and that the service is never used by the user.

Then, there is selected 220 (say by the policy determiner 120) a policy defined for an attribute combination that includes the username's data ('Jon S'), the device's data ('Jail Broken'), the network's data ('Dragon Bar—Free') and the service's data ('Never Used') from the database of policies.

Optionally, for selecting 220 the policy from the database of policies, there is further used additional data, say by the policy determiner 120, as described in further detail hereinabove.

For example, based on absence of the 'Dragon Bar—Free' access point from both a white list and a black list, that are predefined in advance by an administrator of the apparatus 1000, the policy determiner 120 may find the 'Dragon Bar—Free' access point to require further clearance.

Based on that finding, the policy determiner 120 would rather use a more general attribute combination that includes the username's data ('Jon S'), the device' data ('Jail Broken'), the network's data ('Awaiting Clearance') and the service's data ('Often Used').

Then, the access of the user to the information technology service using the remote client device over the network is controlled 230 based on the determined 220 policy, say by the access controller 130, as described in further detail hereinabove.

Depending on what the determined 220 policy dictates, the controlling 230 of the access may include, but is not limited to, suspending the user's access to the service from the client device, suspending the user's access to the service from all client devices, restricting the user's access to specific activities, etc.

For example, the user's attempt to login into the service may be blocked or allowed, a user-specific configuration on the service may be modified while the user is already logged in, say for revoking the user's authorization to update files or access certain file libraries, the user may be disconnected from the service or from several services (say using an SLO (Single Logout)), etc., as known in the art.

In one example, the determined 220 policy is a policy defined for the specific combination of user (i.e the user's username), client device data (say that the device is iOS jail broken), network used for the access (say a specific access point name), and a specific cloud service (say Amazon Webservices™).

In the example, the policy dictates a restricting of the access to the service to reading only. Accordingly, a user-specific configuration that defines what the user can do on the service is modified 230, such that the user is blocked 230 from updating any documents or data that reside on the cloud service.

Thus, with the method, remote user access to an information technology service such as an organization's computing resource (say a software development tool or a cloud service account) may be controlled 230 based on a data combination that includes data on the user, the client device, the network, and the information technology service.

In one example, a user-employee who wishes to access a cloud service on which an organization stores confidential documents, using a laptop computer on which a specific document reader is installed by the organization, is allowed access to the cloud service over any network, as long as the reader is active on the laptop.

However, in the example, if the specific reader is disabled or removed from the laptop, the user is allowed to access the cloud service using the laptop only when connected to the organization's internal, wired computer network, but cannot update files on the cloud service, and cannot access the service using any other client device.

Optionally, when carrying out one or more of the steps of the exemplary method or prior to carrying out one or more of the steps, the access control computer communicates with the client device (say a smart mobile phone, tablet computer, or laptop computer, etc., as known in the art) in use by a user (say the employee).

Optionally, the receiving 210 of the data on the client device includes communicating with a client application that runs on the client device, for receiving at least a part of the data on the client device. The client application extracts at least a part of the data on the client device, say from configuration data of the client device, as described in further detail hereinbelow. Then, the client application sends the extracted data, say to the data receiver 110 of apparatus 1000, as described in further detail hereinabove.

In one example, the client application identifies a software component that contains vulnerabilities on the client device, say an outdated software or operating system, a disabled anti-virus program, a disabled firewall, traces of Apple™ iOS jailbreaking (say of installation of certain kernel patches), etc., as known in the art. Then, the client application sends data that indicates the vulnerabilities found on the client device, say to the data receiver 110 of apparatus 1000, as described in further detail hereinabove.

Optionally, the receiving 210 of the data on the network includes communicating with a client application that runs on the client device, for receiving at least a part of the data on the network. The client application extracts at least a part of the data on the network (say on an access point that the client device is connected to), on the client device, say from communication data that pertains to the network, while the client device is connected to the network. Then, the client application sends the extracted data, say to the data receiver 110 of apparatus 1000, as described in further detail hereinabove.

In one example, the client application may determine if the network is risky—say rogue (say using a white list or a black list received from apparatus 1000), compromised (say using anti-virus software), under a man-in-the-middle attack (say by inspecting data packets received by the client device) etc., as known in the art. Then, the client application sends data that indicates that the network is risky to the data receiver 110 of apparatus 1000, as described in further detail hereinabove.

Optionally, the receiving 210 of the data on the network includes communicating with a client application that runs on the client device, for receiving at least a part of the data on the network. The client application extracts at least a part of the data on the network from a scan for access points, carried out by the client device, as described in further detail hereinabove. Then, the client application sends the extracted data, say to the data receiver 110 of apparatus 1000, as described in further detail hereinabove.

Optionally, the receiving 210 of the data on the client device includes receiving 210 data that indicates installation of a client application that extracts data on the client device from configuration data of the client device, on the client device, as described in further detail hereinabove.

In one example, the received 210 data that indicates the installation, is a digital certificate received 210 from the client device, as described in further detail hereinbelow.

Optionally, the receipt 210 of the data that indicates installation of the client application is used to distinguish between monitored client device and unmonitored client devices when controlling the remote access of client devices to the information technology service, as described in further detail hereinabove.

For example, the receipt 210 of the data that indicates installation of the client application may be used as a prerequisite for the remote access, such that absent the receipt 210 of the data that indicates the installation, the user is not allowed access to the information technology service, as described in further detail hereinbelow.

Optionally, the exemplary method further includes a preliminary step in which the client application is downloaded and installed on the client device, say from the Apple™ AppStore or from Google™ Play, sent to the user (say as an email attachment), by the data receiver 110 or another part of apparatus 1000, etc.

In a first example, the downloaded application already includes the digital certificate. In a second example, the digital certificate is downloaded afterwards, say from a certificate authority, say using functionality provided by the downloaded client application.

Optionally, in the method, one or more client devices other than that user's, a computer on which the service is implemented, etc., are communicated, say for receiving 210 the data on the service, on the network, on one or more other computer networks, etc., as described in further detail hereinabove.

In a first example, at least a part of the data on the service is received 210 by querying one or more configuration database tables of a database used on the computer that implements the IT service, say for data on configuration of the service, on current load on the service (say the number of users), etc.

In a second example, at least a part of the data on the service is received 210 by querying one or more configuration database tables of a database used on the computer that implements the service, for data on user-configuration of the service, say on authorizations granted to each active (i.e. logged in) user.

Optionally, the method further includes a preliminary step in which an operator, administrator or programmer is allowed to define and update policies to be used in the policy determination 220, say by the policy data definer of apparatus 1000, as described in further detail hereinabove.

In one example, the policy data definer is used by the operator to define the policies using unique user-device-network-service specific database records, each of which records defines a policy specific for one user-device-network-service combination, as described in further detail hereinbelow.

Optionally, the steps of the exemplary method are repeated periodically, say every two or three minutes, or rather whenever receiving 210 new data on a user, client device, network, service, or any combination thereof.

As a result, the received 210 data may is periodically updated 210 with newly received 210 data, the policy is re-determined 220 in light of the updated 210 data, and the access is controlled 230 based on the re-determined 220 policy, even as the user is still connected to the information technology service.

As a result, an organization may be able to monitor, condition, and control remote access to the organization's IT technology services (say databases, file systems, etc.), external IT services (say cloud service accounts, Software as a Service (SaaS) accounts), or both, in a continuous or nearly continuous manner.

Thus, in one example, when a user is an organization's employee who is connected to a cloud service with the employee's laptop via an access point operated by an organization, the user can access all documents stored by the organization on the cloud service.

However, if while interacting with the service, the user switches to a public access point of a restaurant or bar, or to the user's smart phone, in a few minutes time, the service's user-configuration data that pertains to the user is updated as a part of controlling 230 the access. As a result, the user can no longer access some of the organization's documents stored on the cloud service (say documents classified by the organization as sensitive or stored in a specific library).

Figure 3:
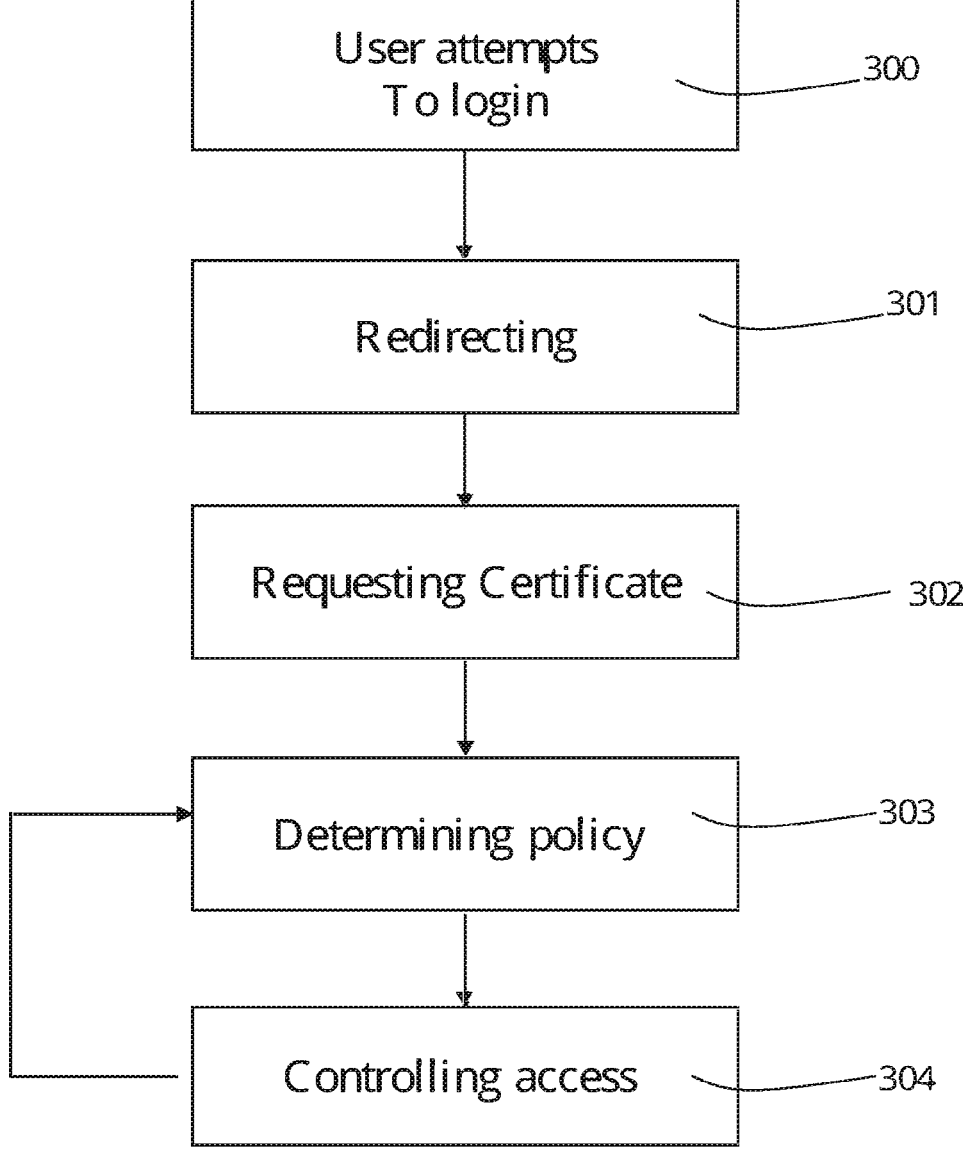
FIG. 3 is a simplified flowchart schematically illustrating a first exemplary implementation scenario of remote access computer security, according to an exemplary embodiment of the present invention.

Reference is now made to FIG. 3 which is a simplified flowchart schematically illustrating a first exemplary implementation scenario of remote access computer security, according to an exemplary embodiment of the present invention.

In a first exemplary implementation scenario, according to an exemplary embodiment of the present invention, when a user attempts to login 300 into an information technology service (say a cloud service), the user is automatically redirected 301 to the context provider 1000, as described in further detail hereinabove.

When the user's successfully connects to the context provider 1000 (say upon an SSL (Secure Sockets Layer) connection and handshake), the context provider 1000 requests 302 a digital certificate that indicates installation of the context monitoring agent 1220 from the client device, as described in further detail hereinabove.

In the first exemplary scenario, the receipt of the data that indicates the installation of the context monitoring agent 1220 on the client device is prerequisite for the remote access. Thus, absent receipt of the data that indicates the installation, the user is not allowed access to the information technology service, as described in further detail hereinabove.

If the digital certificate is received from the client device, the context provider 1000 determines 303 an access policy for the user, as described in further detail hereinabove.

The access policy is determined 303 based on a data combination that includes data on the user, data on the user's client device, data on a network that the user uses for accessing the service, and data on the service, as described in further detail hereinabove. The data is received by the context provider (i.e. apparatus 1000) from the context monitoring agent 1220 installed on the client device, from the service, from one or more other client devices, etc., as described in further detail hereinabove.

Then, the context provider 1000 controls 304 the remote access of the user to the service using the client device and the network, as described in further detail hereinabove.

In the first exemplary scenario, the context provider 1000 continues to monitor the connection between the client device and the service throughout the time period of the connection, say by periodically receiving new data on the device and on the network from the context monitoring agent 1220, from the service, or from both.

When new data on the device or network is received by the context provider 1000, the context provider 1000 combines the new data with previously received data on the user, device, network and service, as described in further detail hereinbelow. Then, the context provider 1000 uses the newly combined data to re-determine 303 the policy, and controls 304 the access according to the re-determined 303 policy.

Figure 4:
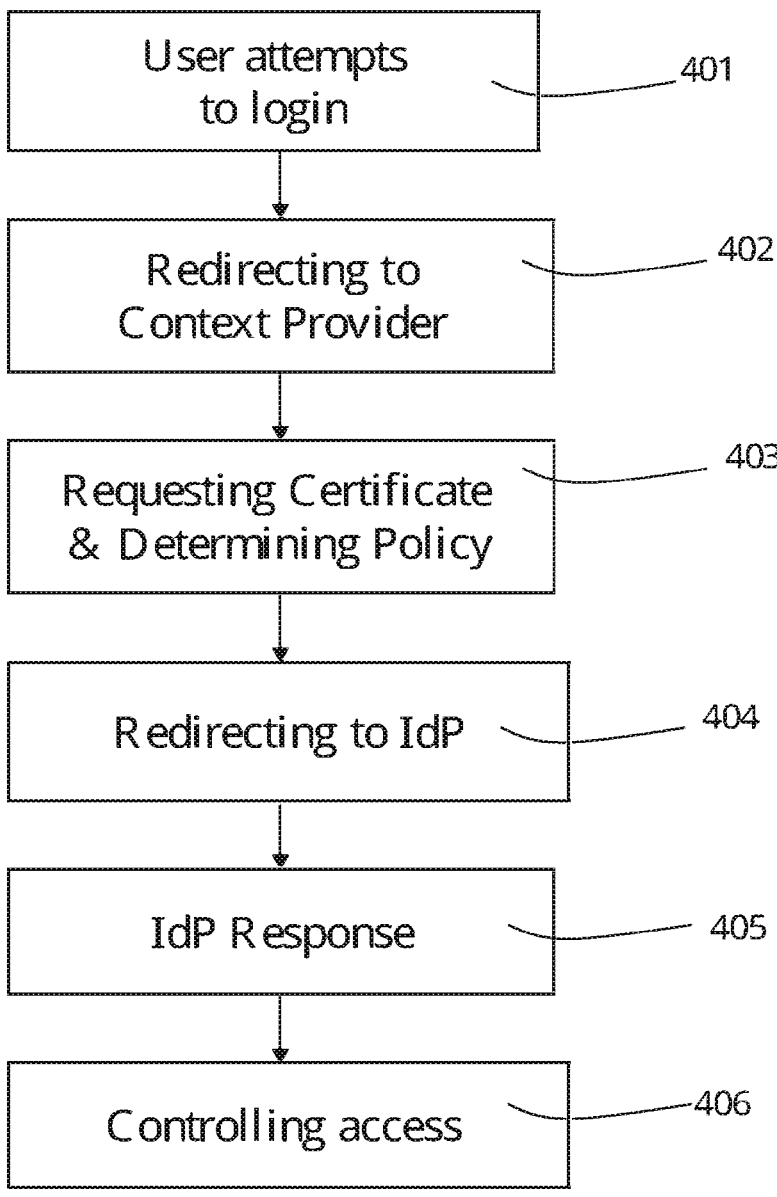
FIG. 4 is a simplified flowchart schematically illustrating a second exemplary implementation scenario of remote access computer security, according to an exemplary embodiment of the present invention.

Reference is now made to FIG. 4 which is a simplified flowchart schematically illustrating a second exemplary implementation scenario of remote access computer security, according to an exemplary embodiment of the present invention.

A second exemplary implementation scenario, according to an exemplary embodiment of the present invention, is based on the SAML (Security Assertion Markup Language) standard that defines a framework for exchanging security information between parties. SAML allows service providers to delegate authentication to separate online Identity providers (IdP).

For example, SAML or similar standards may be used to authenticate an application user to a cloud service associated with the application (say an client agent such as a native application downloaded earlier from the cloud service).

An SAML scenario if tailored for such cases may thus include in one example, the service's identifying a login attempt by a user, and a redirection of the user to an IdP, for authentication. Then, the user establishes an authentication session by logging into the IdP, and the IdP builds the authentication response and posts the response to the service. Finally, the service receives the IdP's response, validates the response, and allows the user to login to the device.

The second exemplary implementation scenario combines such an SAML scenario with the method implemented by apparatus 1000, say when the apparatus 1000 is used as the context provider 1000 of the system illustrated using FIG. 1B hereinabove.

In the second scenario, a user attempts to login 401 into an information technology service (say into a SaaS service, as known in the art).

Then, the service automatically generates an SAML authentication request for the user, and redirects 402 the user's client device and the generated SAML authentication request to the context provider 1000.

Next, the context provider 1000 requests 403 a digital certificate that indicates installation of the context monitoring agent 1220 from the client device, as described in further detail hereinabove.

In this scenario too, the receipt of the data that indicates the installation of the context monitoring agent 1220 on the client device is prerequisite for the remote access. Thus, absent receipt of the data that indicates the installation, the user is not allowed access to the information technology service, as described in further detail hereinabove.

If the digital certificate is received from the client device, the context provider 1000 determines 403 an access policy for the user, as described in further detail hereinabove.

The access policy is determined 403 based on a data combination that includes data on the user, data on the user's client device, data on a network that the user uses for accessing the service, and data on the service, as described in further detail hereinabove. The data is received by the context provider (i.e. apparatus 1000) from the context monitoring agent 1220 installed on the client device, from the service, from other client devices, etc., as described in further detail hereinabove.

If the digital certificate is received from the client device, the context provider 1000 chains the authentication request and redirects 404 the request to the IdP, as known in the art.

Upon receiving 405 an SAML Assertion Response from the IdP, the context provider 1000 forwards the response to the service, and authorizes 406 the user's access to the service, thus controlling 406 the user's access, as described in further detail hereinabove.

Optionally, during the user's connection with the device, the context provider 1000 periodically re-determines an access policy for the user (say based on data received while the user is connected to the service).

Based on the re-determined policy, the context provider 1000 may dynamically controls 406 the user's access, say by changing user-configuration that defines what the user is allowed to do on the service, while the use is still connected to the service, as described in further detail hereinabove.

Thus, in the scenario, whenever new data on the device or network is received by the context provider 1000, the context provider 1000 combines the new data with previously received data on the user, device, network and service. Then, the context provider 1000 uses the newly combined data to re-determine the policy, and starts controlling 406 the access according to the re-determined policy, as described in further detail hereinabove.

Figure 5:
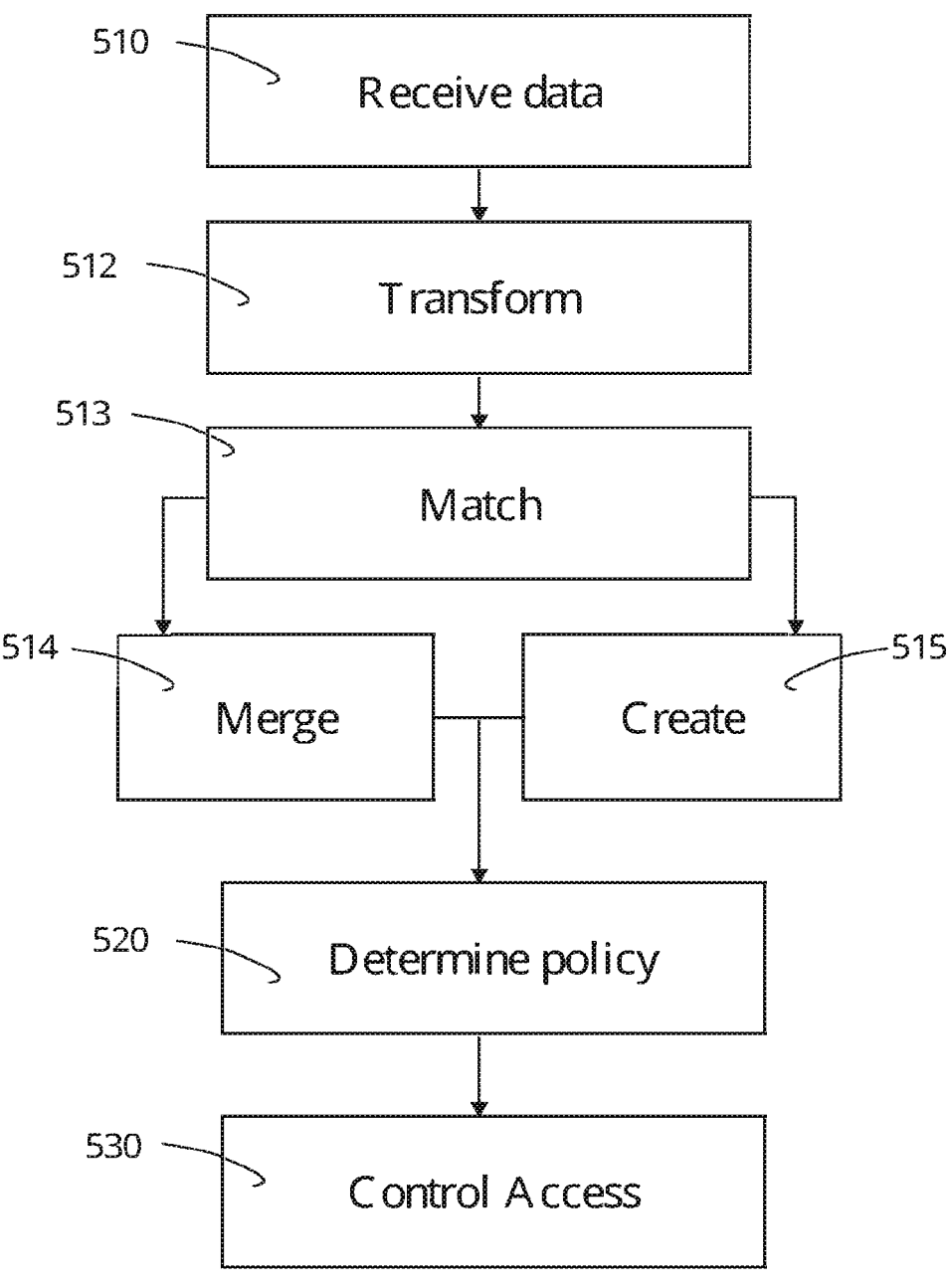
FIG. 5 is a simplified flowchart schematically illustrating a third exemplary implementation scenario of remote access computer security, according to an exemplary embodiment of the present invention.

Reference is now made to FIG. 5 which is a simplified flowchart schematically illustrating a third exemplary implementation scenario of remote access computer security, according to an exemplary embodiment of the present invention.

In a third exemplary implementation scenario, according to an exemplary embodiment of the present invention, the data receiver 110 of apparatus 1000 receives 510 data from one or more sources (say client devices, other computers, etc.), as described in further detail hereinabove.

The received 510 data include data on the user, data on a client device that the user uses, data on a service that the user wishes to access or is already connected to, and data on one or more network (say the network that the device is connected to or a network in vicinity of the client device), as described in further detail hereinabove.

Optionally, the data receiver 110 receives 510 at least a part of the data on the user from the user's client device, say a username, a password, biometric data (say a biometric template extracted from the user's fingerprint, as known in the art), etc., as taken from the user on the device, say using a client application of a cloud service.

Optionally, the data receiver 110 receives 510 at least a part of the data on the user from other computers, say from a computer that the service is implemented on (say data entered by the user when trying to login), from an IdP, from a social networking service like Facebook™, etc., as described in further detail hereinabove.

Optionally, the data receiver 110 receives 510 at least a part of the data on the client device from the client device, say from a client application installed on the client device, say from the client application also referred to hereinabove as the context monitoring agent 1220, as described in further detail hereinabove.

Thus, in one example, the client application extracts the data on the client device from configuration data of the client device's operating system, say using an API (Application Programming Interface) or by reading tables, files, or logs of the client device's operating system, as known in the art.

The configuration data may include, but is not limited to: data that lists applications installed on the client device, data on statuses of applications installed on the client device (say that a specific application used for encrypting files on the client device is stopped or removed), etc., as described in further detail hereinabove.

The data on the client device that is extracted by the client application, may additionally or alternatively include data on the user's activities, say on the user's attempt to stop an anti-virus program installed on the device, to remove restrictions imposed by the device's operating system (say an iOS jail break), etc.

Optionally, the data receiver 110 receives 510 at least a part of the data on the network from the user's client device, say from the client application installed on the client device (say the client application also referred to hereinabove as the context monitoring agent 1220), as described in further detail hereinabove.

The data on the network may include but is not limited to: data identifying the access point that the user's client device is connected to, data identifying access points revealed in a scan carried out by the client device, data that indicates that a specific access point as malicious, etc., as described in further detail hereinabove.

Optionally, the data receiver 110 receives 510 at least a part of the data on the network from one or more other computers, as described in further detail hereinabove.

For example, the data on the network may include data received from a database of malicious access points that is available from SaaS data security software companies, data from a data security program installed on client devices other than the user's, network topography data from a system administrator's computer, etc.

Optionally, the data receiver 110 receives 510 at least a part of the data on the service from the service, say by querying the service system tables or files using an API, or other interface provided by the service's provider.

The data on the service may include but is not limited to: the service's status (say that the service is under hackers attack), the service's configuration (say a use of a vulnerable software component by the service), a user-configuration (say that a specific user connected to the service can access all documents on the service), etc.

The data mentioned hereinabove may be received 510 by pushing—say when the client device or other computer sends a part of the data to apparatus 1000, by pulling—say when the data receiver 110 queries Facebook™ for data on the user, queries the service for configuration data, etc., or any combination thereof.

In the exemplary scenario, whenever data that pertains to a user, a client device, a network, a service or any combination thereof, is received 510 by the data receiver 110, the data receiver 110 transforms 512 the received 510 data, say using one or more rules predefined by an administrator or programmer of apparatus 1000.

Optionally, the transformation 512 of the received 510 data includes a conversion of the data into a format different from the format that the data is received 510 in, say by changing file format, fonts, etc., as known in the art.

Optionally, the transformation 512 of the received 510 includes translating terms or changing different terms of a same meaning into a common term, say using an on-line dictionary, as known in the art.

In the exemplary scenario, the data receiver 110 stores the transformed 512 data in a database also referred to hereinabove as a context database, such that the data is consolidated into one or more database records, as a part of an on-going data consolidation process.

More specifically, the data receiver 110 attempts to the match 513 one or more parts of the received 510 and transformed 512 data with data that already reside in the context database.

Thus, in one example of that attempt at matching 513, when data received 510 from a client device in use by a user—'Mike K' indicates that the user is connected to a network called 'ABC111', the data receiver 110 tries to find 513 a record that pertains to a user 'Mike K' in the context database. If the context database holds more than one record that pertains to the user 'Mike K', the data receiver 110 uses 513 the most recently inserted one of the records.

If the most recently inserted record that pertains to 'Mike K' does not include an attribute (i.e. field) that pertains to a network yet, the data receiver 110 inserts the network name 'ABC111' in that field, thus merging 514 the received 510 data on the network with the record.

However, if the context database holds no record that pertains to 'Mike K', or the most recently inserted record already includes an attribute that pertains to a network, but the attribute is of another network (say 'NZ Mall'), the data receiver 110 inserts 515 a new record for 'Mike K' with a network attribute—'ABC111'.

Similarly, shortly thereafter, the user 'Mike K' attempts to login to a specific cloud service (say 'Dropbox™') account, and the most recent record added or updated for the user 'Mike K' is similarly added the service attribute 'Dropbox', unless already holding another service name. If the most recent record added or updated for the user 'Mike K' already holds another service name, a new record for the user 'Mike K' with a service attribute 'Dropbox' is added to the context database.

As more data is received 510 by the data receiver 110, and as a result of the on-going consolidation process, the context database stores a plurality of records, such that each one of the records holds a specific combination of user, device, network and service attributes. Thus, each one of the records of the context database represents a specific circumstance of device, network and service use by the specific user.

Further in the exemplary scenario, there is determined 520 a policy for controlling access to the information technology service based on the combined data as stored in the context database, say by the policy determiner 120 of apparatus 1000, as described in further detail hereinabove.

Optionally, for determining 520 the policy, there is further used a database of policies predefined in advance (say by an administrator of apparatus 1000), as described in further detail hereinabove.

In one example, the policy is determined 520 by selecting a policy defined for the specific combination of data on the user (say 'Mike K'), client device (say 'Safe'), network (say 'ABC111'), and service (say 'Dropbox') from the database of policies, as described in further detail hereinabove.

Optionally, the policy determiner 120 uses additional data for selecting the policy from the database of policies, as described in further detail hereinabove.

In one example, based on absence of 'ABC111' from a white list as well as from a black list, both of which lists are predefined in advance by an administrator of the apparatus 1000, the policy determiner 120 may find the access point to require further clearance. Based on the finding, the policy determiner 120 would rather use a more general attribute combination that includes the username's data ('Mike K'), the device's data ('Safe'), the network's data ('Awaiting Clearance') and the service's data ('Dropbox').

Then, the access of the user to the information technology service using the remote client device over the network is controlled 530 based on the determined 520 policy, say by the access controller 130, as described in further detail hereinabove.

Figure 6:
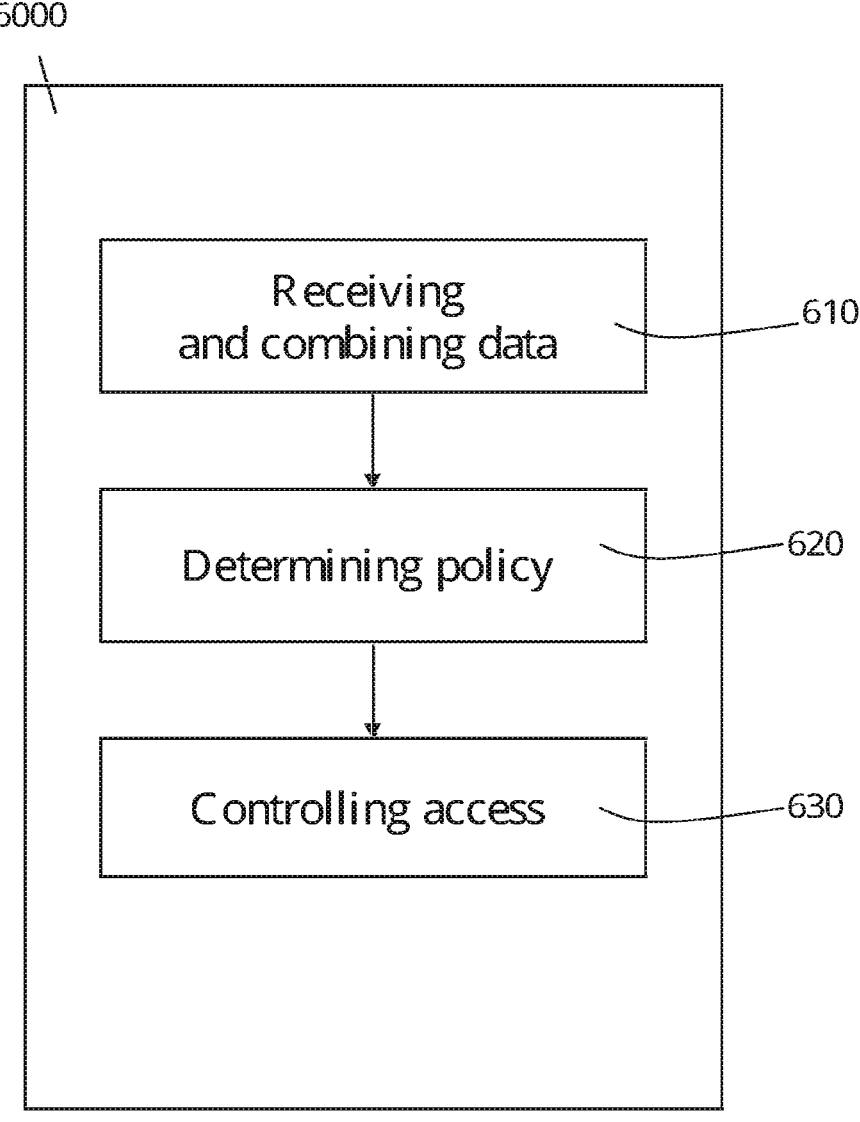
FIG. 6 is a simplified block diagram schematically illustrating an exemplary computer readable memory storing computer executable instructions for performing steps of remote access computer security, according to an exemplary embodiment of the present invention.

Reference is now made to FIG. 6 which is a simplified block diagram schematically illustrating an exemplary computer readable memory storing computer executable instructions for performing steps of remote access computer security, according to an exemplary embodiment of the present invention.

According to an exemplary embodiment of the present invention, there is provided a non-transitory computer readable medium 6000, such as a CD-ROM, a USB-Memory, a Hard Disk Drive (HDD), a Solid State Drive (SSD), etc.

The computer readable medium 6000 stores computer executable instructions, for performing steps of remote access computer security on a computer. The computer may actually include one or more computers, as described in further detail hereinabove. The steps may thus be performed on one or more computer processor(s) of the computer, as described in further detail hereinabove.

The computer executable instructions include a step of receiving 610 and combining 610 data on a client device—say on the client device's configuration, and data on a user of the client device—say the user's username or biometric data, as described in further detail hereinabove.

The data on the client device and data on the user may be received 610 from the client device, from a computer other than the client device (say from a computer used by an organization's System administrator or Database Administrator), etc., or any combination thereof, as described in further detail hereinabove.

The data on the configuration may include but is not limited to: data listing applications installed on the client device, data on statuses of applications installed on the client device (say that a specific application used for encrypting files on the client device is stopped or removed), etc., as described in further detail hereinabove.

Further in receiving 610 step, there is received 610 and combined 610 with the data on the user and the client device, data on a network—say on an access point used for the access, and data on an information technology service—say on a cloud service or database that the user is connected to or that the user attempts to connect to.

The data on the network may include but is not limited to: data identifying the access point that the user's client device is connected to, data identifying access points revealed in a scan carried out by the client device, data that indicates that a specific access point is malicious, etc., as described in further detail hereinabove.

The data on the service may include but is not limited to: the service's status (say that the service's website is hacked), configuration (say on a vulnerable software component used by the service), user-configuration (say that a specific user connected to the service can access all documents on the service or has unused access keys), etc.

The data on the network and the data on the service may be received 610 from the client device, from a computer used by an organization's System Administrator or Database Administrator, from a computer that the service is implemented on, from a client device other than the user's, etc., or any combination thereof.

The computer executable instructions further include a step of determining 620 a policy for controlling access to the information technology service based on the combined 610 data, as described in further detail hereinabove.

The computer executable instructions further include a step of controlling 630 the access of the user to the information technology service using the remote client device over the network, based on the determined 620 policy, as described in further detail hereinabove.

The controlling 630 of the access may include, but is not limited to: suspending the user's access to the service from the client device, suspending the user's access to the service from all client devices, restricting the user's access to specific activities, etc., as known in the art, as described in further detail hereinabove.

Optionally, when performing one or more of the steps or prior to performing one or more of the steps, the computer communicates with the client device (say a smart mobile phone, tablet computer, or laptop computer, etc., as known in the art) in use by a user (say the employee).

In one example, the receiving 610 of the data on the client device may include communicating with a client application that runs on the client device, for receiving 610 a least a part of the data on the client device. The client application extracts at least a part of the data on the client device, say from configuration data of the client device, as described in further detail hereinabove.

In a second example, the receiving 610 of the data on the network includes communicating with a client application that runs on the client device, for receiving 620 at least a part of the data on the network. The client application extracts at least a part of the data on the network (say on an access point that the client device is connected to), on the client device, say from communication data that pertains to the network, while the client device is connected to the network.

In a third example too, the receiving 610 of the data on the network includes communicating with a client application that runs on the client device, for receiving 610 at least a part of the data on the network. The client application extracts at least a part of the data on the network from a scan for access points, carried out by the client device, as described in further detail hereinabove.

In a fourth example, the receiving 610 of the data on the client device includes receiving 610 data (say a digital certificate) that indicates installation of a client application that extracts data on the client device from configuration data of the client device, on the client device, as described in further detail hereinabove.

Optionally, when executing the policy determining 620 and access controlling 630 steps, the receipt 610 of the data that indicates installation of the client application is used as a prerequisite for the remote access. Thus, in one example, in absence of the receipt 610 of the data that indicates the installation, the user is not allowed access to the information technology service, as described in further detail hereinabove.

Optionally, the step of receiving 610 and combining 610 the data includes communicating with one or more client devices other than that user's, with a computer on which the service is implemented, etc., say for receiving 610 the data on the user, device, service, network, one or more other computer networks, etc., as described in further detail hereinabove.

In a first example, at least a part of the data on the service is received 610 by querying configuration database tables of a database used on the computer that implements the information technology service, say for data on configuration of the service, on current load on the service (say the number of users), etc.

In a second example, at least a part of the data on the service is received 610 by querying configuration database tables of a database used on the computer that implements the service, for data on user-configuration of the service, say on authorizations granted to each active (i.e. logged in) user.

Optionally, the steps of computer instructions are repeated periodically, say every two or three minutes, or rather whenever receiving 610 new data on the user, client device, network, service, or any combination thereof, as described in further detail hereinabove.

Thus, the received 610 data method is periodically updated 610 with newly received 610 data, the policy is re-determined 620 in light of the updated 610 data, and the access is controlled 630 based on the re-determined 620 policy while the user is still connected to the information technology service.

An organization may thus be able to dynamically monitor, condition, and control remote access to the organization's internal information technology services (say databases or files), external information technology services (say cloud service accounts), or both, continuously or nearly continuously, as described in further detail hereinabove.

It is expected that during the life of this patent many relevant devices and systems will be developed and the scope of the terms herein, particularly of the terms "Computer", "Smart Phone", "Tablet", "Laptop", "Access Point", "Information Technology Service", "Network", "Security Assertion Markup Language (SAML)", "Identity Provider (IdP)", "Cloud Service", "Software as a Service (Saas)", "CD-ROM", "USB Memory", "Hard Disk Drive (HDD)", "Solid State Drive (SSD)", "File", "Database" and "API (Application Programming Interface)", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method of remote access computer security, the method comprising steps a computer processor is programmed to perform, the steps comprising:

by a computer, receiving and combining data on a client device, data on a user of the client device, and data on an information technology service accessible over a network, said receiving of the data on the client device comprising receiving a digital certificate indicating installation on the client device of a client application, the client application extracting data on the client device from configuration data of the client device;

determining a policy for controlling remote access to the information technology service according to the combined data and further according to the device's being monitored, as indicated by the installation of the client application; and applying the determined policy on the user by restricting activity of the user on the information technology service according to the determined policy.

2. The method of claim 1, wherein the data on the client device comprises data on configuration of the client device.

3. The method of claim 1, wherein the data on the client device comprises data listing at least one application installed on the client device.

4. The method of claim 1, wherein the data on the client device comprises data on a status of at least one application installed on the client device.

5. The method of claim 1, wherein said receiving of the data on the client device comprises communicating with a client application running on the client device and extracting at least a part of the data on the client device from configuration data of the client device.

6. The method of claim 1, wherein said receiving of the data on the information technology service comprises receiving data on configuration of the information technology service.

7. The method of claim 1, wherein said receiving of the data on the information technology service comprises receiving data on user-configuration of the information technology service.

8. The method of claim 1, further comprising: while the user is communicating with the information technology service using the client device over the network, periodically updating the combined data with new data, re-determining the policy in light of the updated combined data, and restricting the activity according to the re-determined policy.

9. An apparatus for remote access computer security, the apparatus comprising:

electronic circuitry comprising a hardware processor of a computer;

a data receiver, implemented on the hardware processor, configured to receive and combine data on a client device, data on a user of the client device, and data on an information technology service accessible over a network and further configured to receive at least a part of the data on the client device, by receiving a digital certificate indicating installation on the client device of a client application, the client application extracting data on the client device from configuration data of the client device;

a policy determiner, in communication with said data receiver, configured to determine a policy for controlling remote access to the information technology service according to the combined data and further according to the device's being monitored, as indicated by the installation of the client application; and an access controller, configured to apply the determined policy on the user by restricting activity of the user on the information technology service according to the determined policy.

10. The apparatus of claim 9, wherein said data receiver is further configured to receive at least a part of the data on the client device, by communicating with a client application running on the client device and extracting at least a part of the data on the client device from configuration data of the client device.

11. The apparatus of claim 9, wherein said data receiver is further configured to receive at least a part of the data on the information technology service, by receiving data on configuration of the information technology service.

12. The apparatus of claim 9, wherein said data receiver is further configured to receive at least a part of the data on the information technology service, by receiving data on user-configuration of the information technology service.

13. A non-transitory computer readable medium storing computer processor executable instructions for performing steps of remote access computer security on a computer, the steps comprising:

by the computer, receiving and combining data on a client device, data on a user of the client device, and data on an information technology service accessible over a network, said receiving of the data on the client device comprising receiving a digital certificate indicating installation on the client device of a client application, the client application extracting data on the client device from configuration data of the client device;

determining a policy for controlling access to the information technology service according to the combined data and further according to the device's being monitored, as indicated by the installation of the client application; and applying the determined policy on the user by restricting activity of the user on the information technology service according to the determined policy.

14. The computer readable medium of claim 13, wherein the data on the client device comprises data on configuration of the client device.

15. The computer readable medium of claim 13, wherein the data on the client device comprises data listing at least one application installed on the client device.

16. The computer readable medium of claim 13, wherein the data on the client device comprises data on a status of at least one application installed on the client device.

17. The computer readable medium of claim 13, wherein said receiving of the data on the client device comprises communicating with a client application running on the client device and extracting at least a part of the data on the client device from configuration data of the client device.

18. The computer readable medium of claim 13, wherein said receiving of the data on the information technology service comprises receiving data on configuration of the information technology service.

19. The computer readable medium of claim 13, wherein said receiving of the data on the information technology service comprises receiving data on user-configuration of the information technology service.

* * * * *